United States Patent
Motahari Sharif et al.

(10) Patent No.: US 10,412,907 B2
(45) Date of Patent: Sep. 17, 2019

(54) DEFICIT-IRRIGATION CONTROL SYSTEM, BASED ON DYNAMIC ORGANIZATION OF MULTI-AGENTS SYSTEMS AND WIRELESS OR WIRED NETWORK

(71) Applicants: Mohamad Javad Motahari Sharif, Tehran (IR); Mohamad Bagher Menhaj, Tehran (IR); Mansoure Kafash, Tehran (IR)

(72) Inventors: Mohamad Javad Motahari Sharif, Tehran (IR); Mohamad Bagher Menhaj, Tehran (IR); Mansoure Kafash, Tehran (IR)

(*) Notice: Subject to any disclaimer, the term of this patent is extended or adjusted under 35 U.S.C. 154(b) by 641 days.

(21) Appl. No.: 15/065,835

(22) Filed: Mar. 9, 2016

(65) Prior Publication Data
US 2016/0183483 A1 Jun. 30, 2016

(30) Foreign Application Priority Data
Mar. 10, 2015 (IR) .................. 139350140003013743

(51) Int. Cl.
G05D 11/00 (2006.01)
A01G 25/16 (2006.01)

(52) U.S. Cl.
CPC .................. *A01G 25/165* (2013.01)

(58) Field of Classification Search
CPC ..... A01G 25/165; A01G 25/16; A01G 25/167
(Continued)

(56) References Cited

U.S. PATENT DOCUMENTS

| 8,554,380 B2 | 10/2013 | Nourian |
| 2006/0161309 A1* | 7/2006 | Moore .................. A01G 25/16 700/284 |

(Continued)

FOREIGN PATENT DOCUMENTS

| CN | 2585550 Y | 11/2003 |
| CN | 201004880 Y | 1/2008 |

(Continued)

OTHER PUBLICATIONS

Bareja, B. G. (Nov. 2014). Introduction: What are Plant Growth, Differentiation and Development? Retrieved from CropsReview: https://www.cropsreview.com/plant-growth.html.
(Continued)

*Primary Examiner* — Vu A Le
(74) *Attorney, Agent, or Firm* — NovoTechIP International PLLC

(57) ABSTRACT

A deficit irrigation method is disclosed. The method includes steps of receiving, at a controller, a plurality of inputs including a growth stage of a plant, a development stage of the plant, a water level at a reservoir, and a full irrigation data; computing, at the controller, a stress intensity factor for irrigation of a plant; computing, at the controller, a correction factor based on the calculated stress intensity factor; computing, at the controller, a deficit irrigation factor based on the correction factor and the full irrigation data; and controlling an irrigation valve in a wired or a wireless communication with the controller to enable a deficit irrigation of the plant in accordance with the deficit irrigation factor, wherein the deficit irrigation factor controls when and how much to irrigate via the irrigation valve.

20 Claims, 2 Drawing Sheets

(58) Field of Classification Search
USPC .......................................................... 700/284
See application file for complete search history.

(56) References Cited

U.S. PATENT DOCUMENTS

| | | | |
|---|---|---|---|
| 2011/0174706 A1* | 7/2011 | Russell ................... | A01G 25/00 210/170.01 |
| 2012/0109387 A1* | 5/2012 | Martin .................. | A01G 25/167 700/284 |
| 2013/0253712 A1 | 9/2013 | Alexanian | |
| 2015/0366149 A1* | 12/2015 | Canyon ................ | A01G 25/167 700/284 |
| 2016/0063420 A1* | 3/2016 | Tomii ............... | G06Q 10/06315 705/7.24 |

FOREIGN PATENT DOCUMENTS

| | | |
|---|---|---|
| CN | 101211178 A | 7/2008 |
| CN | 202083940 U | 12/2011 |
| CN | 102402185 A | 4/2012 |
| CN | 102870654 A | 1/2013 |
| WO | 1999039567 A1 | 8/1999 |
| WO | 2013012826 A1 | 1/2013 |

OTHER PUBLICATIONS

Goldhamer, D. A. (Fourth Edition 2005). Tree water requirements & regulated deficit irrigation. In Pistachio Production Manual (pp. 103-116). Fruit & Nut Reserch & Information, Univercity of California.

Goldhamer, D., & Beede, R. (2004). Regulated deficit irrigation effects on yield, nut quality and water-use efficiency of mature pistachio trees;. Journal of Horticultural Science & Biotechnology, 538-545.

Hussein M., A.-G., & Dewidar, A.Z. (2018). Integrating deficit irrigation into surface and subsurface drip irrigation as a strategy to save water in arid regions. Agricultural Water Management, 55-61.

Industries, Department of Environment and Primary. (Dec. 2009). Irrigation Scheduling for Regulated Deficit Irrigation (RDI). Retrieved from The State of Victoria: http://agriculture.vic.gov.au/agriculture/farm-management/soil-and-water/irrigation/irrigation-scheduling-for-regulated-deficit-irrigation-rdi.

Manning, D., Lurbé, S., Comas, L., Trout, T., Flynn, N., & Fonte, S. (2018). Economic viability of deficit irrigation in the Western US. Agricultural Water Management, 114-123.

E. Fereres, P. Steduto, H. C. Theodore ↵ D. Raes, Crop yield response to water, Rome: Food and Agriculture Organization of the United Nations (FAO), 2012.

E. Fereres, D. A. Martinich, T. M. Aldrich, J. R. Castel, E. Holzapfel ↵ H. Schulbach", Drip irrigaation saves money in young almond orchards", California Agriculture ,Oct. 1982.

R. J. Brachman, A Concise Introduction to Multiagent Systems and Distributed Artificial Intelligence, USA: Morgan & Claypool, 2007.

P. Mathieu, "Dynamic Organization of Multi-Agent Systems," in first international joint conference on Autonomous agents and multiagent systems, Southern California, 2002.

* cited by examiner

DEFICIT-IRRIGATION CONTROL SYSTEM, BASED ON DYNAMIC ORGANIZATION OF MULTI-AGENTS SYSTEMS AND WIRELESS OR WIRED NETWORK

CROSS REFERENCE TO RELATED APPLICATION

This application claims the benefit of priority to an Iran Application Serial Number 139350140003013743, filed on Mar. 10, 2015, entitled "a deficit-irrigation control system, based on dynamic organization of multi-agents systems and wireless or wired network" and issued as Iran Patent Number 86863 on Oct. 3, 3015, the entire content of which is incorporated herein by reference.

TECHNICAL FIELD

The present application relates to water conservancy projects and fuzzy control applications, particularly involving non-sufficient irrigation control method based on fuzzy control.

BACKGROUND

Water conservation is a major issue in many parts of the world. In particular, population growth is putting fresh water supplies under tremendous strain. Notably, landscape water usage consumes more than half of the potable water supplies in some areas. Landscape water usage refers to the artificial application of water to promote the growth of desired plants. This is especially true in agricultural areas where crops require frequent watering in order to achieve maximum yield. However, residential, governmental and commercial water usage also significantly taps the available water supply, i.e., yards, golf courses, and parks also demand significant amounts of water to maintain healthy foliage.

In recent years, using in-depth study of soil moisture characteristic of arid and semi-arid areas, meteorological data, evapotranspiration data, optimization theory and fuzzy theory, have proven deficit irrigation as a new promising irrigation method that allows certain cuts in water consumption, especially under the condition of limited water resources.

Because of water-stressed regions, water geographical imbalance and other factors, agricultural water-saving irrigation has become an important breakthrough in agricultural production and the entire international economy. Deficit irrigation is that when water resources are insufficient to meet the full cultivation, the existing water resources are configured optimally for an irrigation system. Deficit irrigation systems involve a lot of mathematical calculations, require large number of input parameters, many of which are difficult to measure. However, this watering technique is becoming increasingly popular among researchers, farmers and authorities.

Currently, irrigation systems are using weather forecast and soil moisture as their main parameters. The most used methods for soil moisture measurement are drying method, TDR method and the neutron method. However, irrigation methods which use weather forecast and soil moisture have major shortcomings: they only measure soil moisture content at individual points which do not accurately reflect the status of soil moisture on a large area as a whole.

The term evapotranspiration (ET) is used in the irrigation field to quantify how much water has been lost from soil through transpiration by plants. An ET value is calculated using actual meteorological data obtained from meteorology stations. The factors typically used to calculate an ET value are temperature, solar radiation, wind speed, vapor pressure or humidity, and barometric pressure. A change in one or more of these parameters can have a direct effect on the ET value used to determine when and how much to water. ET values are usually normalized to a specific type of vegetation. One of these ET values is $ET_o$ which is for 4"-6" tall cool-season grass. ET values are then used in conjunction with other coefficients to determine how much water to apply to replenish the water lost from the soil. Factors that affect determination of the amount of water include the following: (1) type of vegetation; (2) soil type; (3) root depth; (4) topography; (5) micro-climate; and (6) density of vegetation.

SUMMARY

In on general aspect, the instant application describes a deficit irrigation method including steps of receiving at a controller, a growth stage of a plant, a development stage of the plant, a water level at a reservoir, and a full irrigation data and computing, a stress intensity factor for irrigation of a plant. The stress intensity factor represents a strength of the plant to a deficit irrigation and is represented by K having a value between 0 and 1 with a larger value of K reflecting a higher strength to the deficit irrigation and a lower value of K reflecting a lower strength to the deficit irrigation. The stress intensity factor is computed based on the age of the plant, the development stage of the plant and the water level in the reservoir. The method also includes steps of computing a correction factor based on the calculated stress intensity factor, meteorological data and evapotranspiration data; computing a deficit irrigation factor based on the correction factor and the full irrigation data; and sending the deficit irrigation factor to a controller for controlling the irrigation valves in a wired or a wireless communication with the controller to enable a deficit irrigation of the plant in accordance with the deficit irrigation factor. The deficit irrigation factor controls when and how much to irrigate via the irrigation valve The above general aspect may include one or more of the following features. For a selected plant, the growth cycle (age) and development stage may be determined from a server, e.g.: agricultural data banks, internet. Based on the water level in the reservoir, the water resource may be measured. The host computer may calculate the stress intensity factor for the plant. Fuzzy theory may be used for the calculations. The stress intensity factor may represent the fraction of full irrigation the plant requires to cultivate. Real-time meteorological data and evapotranspiration data may be requested and received from a server; e.g. internet, local weather station, etc. The host computer may calculate the correction factor based on the meteorological data, evapotranspiration data and the calculated stress intensity factor. The correction factor may be used for calculating the deficit irrigation that controls when and how much to irrigate the plant.

In accordance with the present application, deficit irrigation control functions may be performed both by a central (host) computer and by localized site control devices located at irrigation sites remote from the host computer. At the site, a site control device receives the deficit irrigation data, which is based upon stress intensity factor, meteorological data and evapotranspiration data The host computer computes a deficit irrigation, which is a fraction of the full irrigation. The deficit irrigation is then sent to a site control device, and deficit irrigation is then used to update the irrigation schedule. This updated irrigation schedule is then used to control irrigation valves (e.g. sprinklers) coupled to the site control device. By using deficit irrigation, a substantial savings in water use can be achieved.

The additional details of the present application are set forth in the accompanying drawings and the description below. Once the details of the application are known, additional alternatives and changes will become obvious to one skilled in the art.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A deficit irrigation system is disclosed that is configured to conserve and apply water during landscape irrigation. A deficit irrigation system may include an irrigation controller, valves, pipes, and sprinkling heads. The irrigation controller, customarily also known as a clock or timer, automatically regulates the opening and the closing of the valves. The valves allow water to pass into the pipes and out of the sprinkling heads thereby irrigating the desired location. Properly configured, an irrigation controller can achieve some conservation of water. Moreover, irrigation controllers which are commonly employed in the agricultural, commercial, governmental and residential settings can be controlled and modified by an algorithm with proper information about the irrigation requirements of the crop.

In one implementation, the deficit irrigation system is configured to compute a stress intensity factor for irrigation of a plant by fuzzy functions. The stress intensity factor may represent the strength of the plant to lack of water and may be used in later computations to calculate the fraction of full irrigation the plant requires to cultivate. The stress intensity factor may be computed based on the age of the plant, the development stage of the plant and water level in the reservoir. The deficit irrigation system is further configured to receive and store evapotranspiration data, meteorological data, and full irrigation data from a server e.g. weather station, internet, etc. The deficit irrigation system may then compute the correction factor for irrigation based on the computed stress intensity factor and the received evapotranspiration data and/or meteorological data. The correction factor and the full irrigation data may be used to compute the deficit irrigation data. The deficit irrigation system may then control the irrigation valve(s) coupled to a site control device in accordance with the deficit irrigation data. The deficit irrigation system may control when and how much to irrigate through each irrigation valve.

Figure 1:
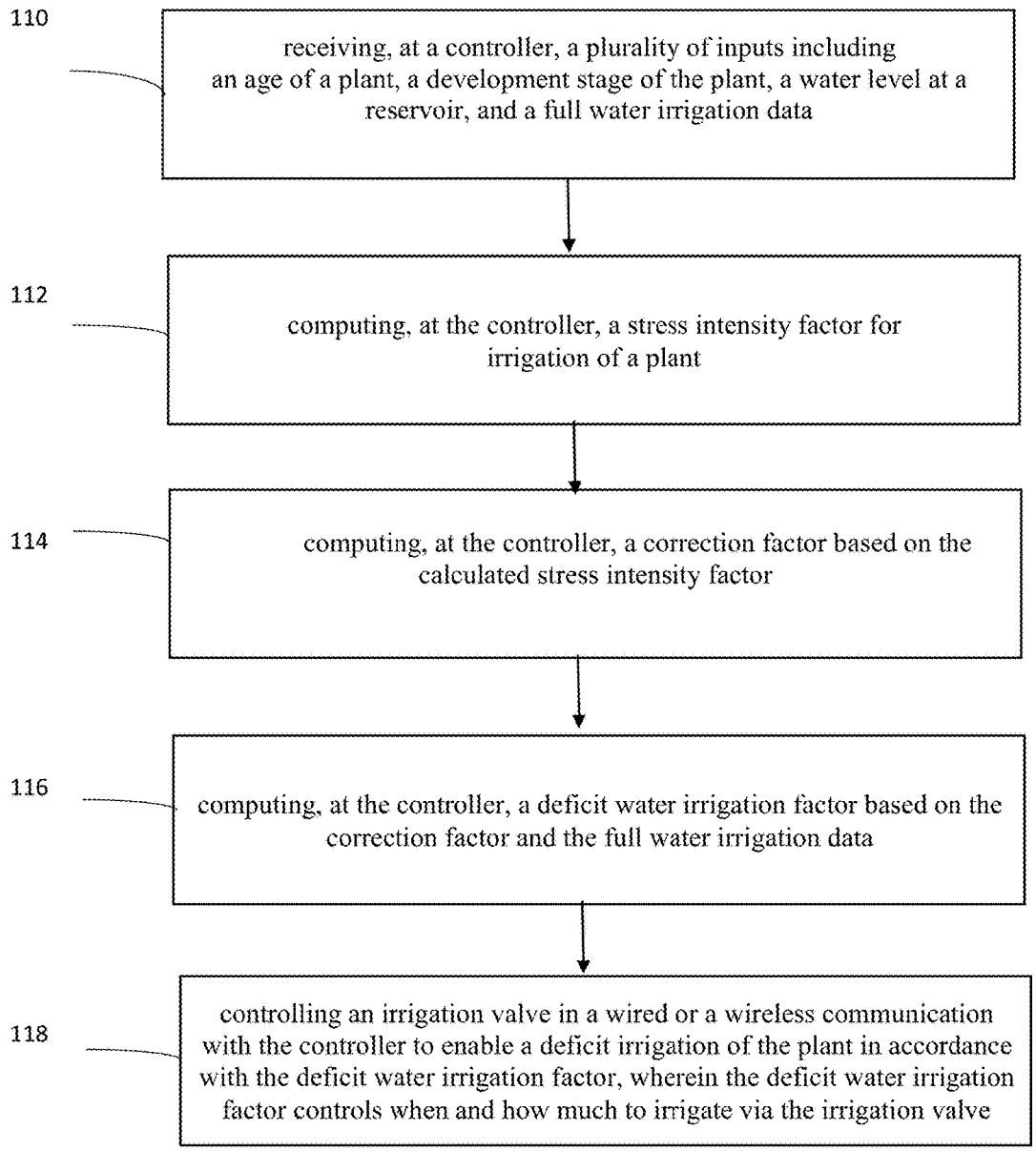
FIG. 1 illustrates an exemplary deficit irrigation method according to the instant application.

FIG. 1 illustrates an exemplary deficit irrigation method 100 in accordance with one implementation of the instant application. The deficit irrigation method 100 may begin with receiving, at a controller, a plurality of inputs (Step 110). The plurality of inputs may include a growth phase of a plant, a development stage of the plant, a water level at a reservoir, and a full irrigation data. The growth phase of the plant may be received from the user input and is calculated based on the age of the plant. The development stage of the plant may also be provided by the user. The water level in the water storage unit, reservoir, may be measured by a water level sensor inside the water reservoir. The full irrigation data may be received from an online database (not shown).

The controller may then compute a stress intensity factor based on the plurality of inputs (Step 112). The controller may compute the stress intensity factor a fuzzy theory-based controlling software package. The stress intensity factor, represented by K, indicates the plant's strength to the lack of water. The stress intensity factor may have a value between 0 and 1 with a larger value of K reflecting a higher strength to the deficit irrigation and a lower value of K reflecting a lower strength to the deficit irrigation.

The control may further compute the plant's irrigation correction factor based on the calculated stress intensity factory (Step 114). The plant's irrigation correction factor may be computed by subtracting the stress intensity factor from one as shown in Formal 1:

$$C = 1 - K \quad (1)$$

where C is correction factor and K is the stress intensity factor.

The correction factor represents the fuzzy inverse of the stress intensity factor. The correction factor and the plant's full irrigation data are used by the controller to compute the deficit irrigation factor for the specific plant (Step 116). The full irrigation data may be computed based on a meteorological data and an evapotranspiration data. The meteorological data and the evapotranspiration data may be received from an external server.

The controller computes the deficit irrigation factor based on the formula (2):

$$\text{Water}_{DI} = C \cdot \text{Water}_{Full\ Irrigation} \quad (2)$$

where $\text{Water}_{DI}$ is the deficit irrigation data, C is the correction factor and $\text{Water}_{FullIrrigation}$ is the full irrigation value.

The deficit irrigation factor is sent to the irrigation valve(s) via either a wired or a wireless communication network to enable a deficit irrigation of the plant in accordance with the deficit irrigation factor which controls how much and when to irrigate the plant (Step 118). The deficient irrigation system may include more than one valve. Each valve may be configured to control a specific irrigation zone based on the types of the plants. The valves may be coupled to an irrigation pump configured to pump the water from the water storage unit to the irrigation site.

In one implementation, the controller is a personal computer including a monitor, processor, and memory, including RAM and a permanent storage medium, such as a hard disk drive, and software operative to carry out the tasks as described herein. It will be appreciated that running the software on a personal computer is cost effective, but it should be noted, however, that the software can run on any computing device having a processor as is well known in the art. In another implementation, the controller may be integrated into other components of the deficit irrigation system. For example, the controller may be embedded in the pump. For another example, the controller may be embedded in the valve.

Figure 2:
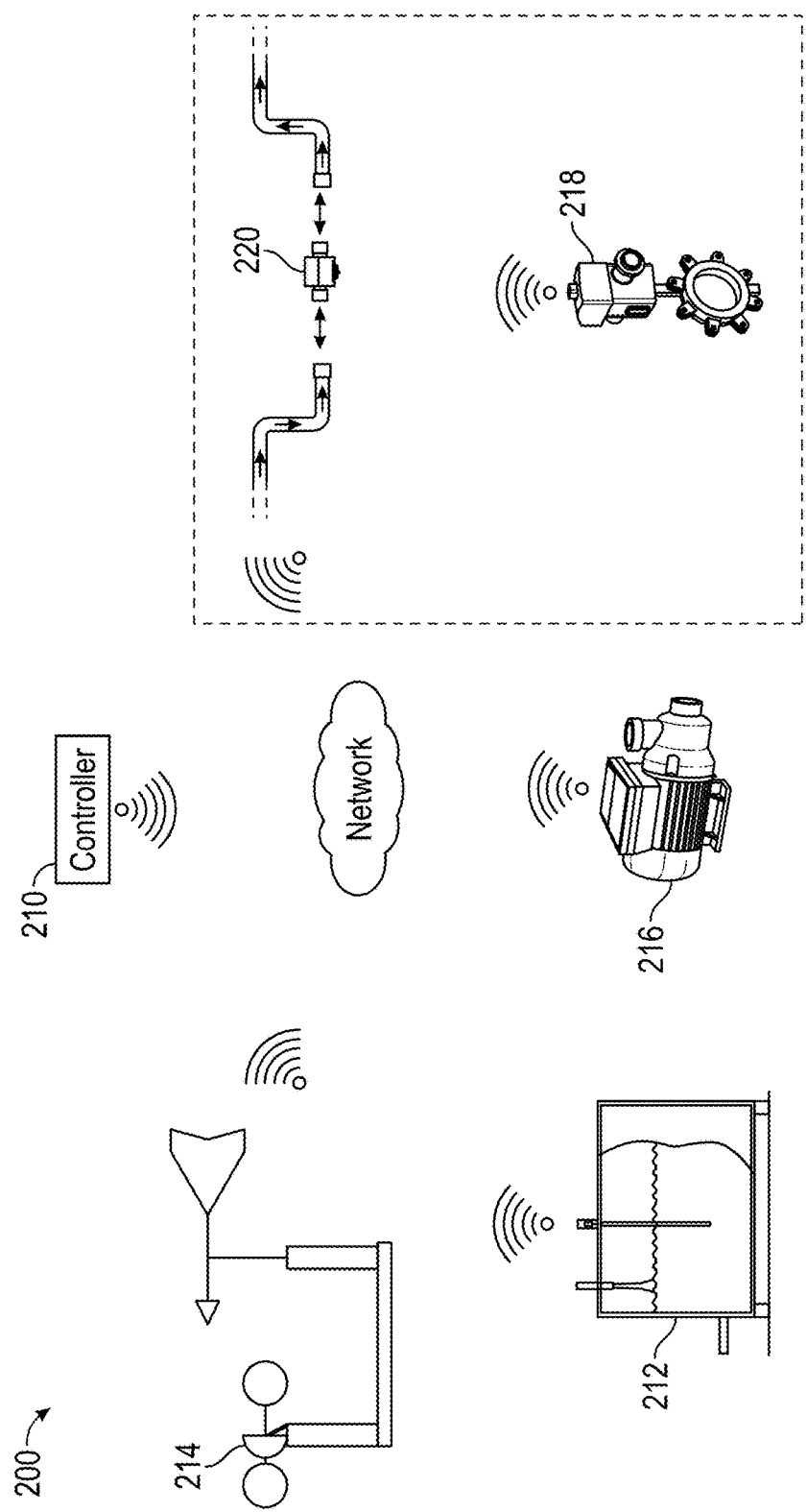
FIG. 2 illustrates an exemplary deficit irrigation system according to the instant application.

FIG. 2 illustrates an exemplary deficit irrigation control system 200. The system 200 includes a site control device 210 (e.g., a controller of FIG. 1), a water reservoir 212, a weather station 214, irrigation valves 216, an irrigation pump 218, and water flow sensors 220. As shown, the site control device 210 is in communication with the water reservoir 212, the weather station 214, the irrigation valves 216, the irrigation pump 218, and the water flow sensors 220. Although the communication is shown to be via a wireless communication network, it may also be via a wired communication network. The wireless communication network may include a short range communication network such as, for example, Bluetooth, NFC, Wi-Fi, etc.

The water reservoir 212 may include a water level sensor. The water level sensor may sense the water level in the water reservoir 212 and report the water level to site control device 210. In one implementation, the water level information may be pulled from the water reservoir 212 by the site control device 210. In another implementation, the water level information may be pushed to the site control device 210 from the water reservoir 212. In latter, scenario the water reservoir 212 may routinely provide the site control device 210 with an update regarding the water level. Alternatively, the water reservoir 212 may provide the site control device 210 with an update only when the water level is at or below a give threshold.

The weather station 214 may provide the meteorological data and the evapotranspiration data to the site control device 210. As noted above, the meteorological data and the evapotranspiration data may be used to determine the full irrigation factor for the plant.

In addition to the foregoing information, the site control device 210 may receive a plurality of other information. The plurality of other information may include a growth phase of a plant and a development stage of the plant. The growth phase of the plant may be received from the user input and is calculated based on the age of the plant. The development stage of the plant may also be provided by the user.

The site control device 210 may be configured to receive the growth phase of a plant, the development stage of the plant, the water level information, and the meteorological data and evapotranspiration data to calculate a deficit irrigation factor. In keeping with the previous example, the site control device 210 may compute a stress intensity factor for irrigation of a plant. The stress intensity factor is computed based on the growth stage of the plant, the development stage of the plant and the water level in the reservoir 212. The site control device 210 may then compute a correction factor based on the calculated stress intensity factor. The correction factor may be calculated based on Formula (1) described above. The site control device 210 may then compute a deficit water irrigation factor based on the correction factor and the full irrigation data and control the irrigation valves 216 in a wired or a wireless communication to enable a deficit irrigation of the plant in accordance with the deficit irrigation factor.

The site control device 210 transmits the deficit irrigation factor to the irrigation pump 218, which is configured to control the irrigation valves 216 coupled to the site control device 210 in accordance with the deficit irrigation. The deficit irrigation controls when and how much to irrigate through each irrigation valve 216.

The water flow sensor 220 on the irrigation valve 216 transmits the water flow-rate to the site control device 214 to monitor the deficit irrigation. The site control device 214 then controls a set of valves 216 through irrigation pump 218 to regulate the irrigation of a plurality of sprinkling heads or other devices used to distribute water.

The meteorological data and evapotranspiration data may be provided from the weather station 214. However, this information can also be gathered from other sources or an external server. The external server may be an internet web site. It should be understood that the present implementation is not limited to any particular type of irrigation or sprinkling system. The present implementation can be utilized on residential sprinkling systems that use PVC pipe or large agricultural irrigation systems such as center-pivot systems, traveler irrigation systems, and an irrigation system for smaller acreage. Further, the irrigation or sprinkling systems may be used, without limitation, for residential, commercial, governmental and agricultural purposes. It should also be noted that the control mechanism is not limited to the preferred implementation. The control mechanism may be implemented through other components of the system. For example, the site controller may be the irrigation valves, the pump or any other controlling device.

Due to the fact that the weather station is generally located at a location remote of the controller, a communication path is established between the weather station and the controller. The communication path is typically via a telephone modem and phone line, to facilitate the receiving of the meteorological data from the weather station to the controller, but many different communication structures may be used within the scope of the present implementation. For example, the communication path may also be established through the internet, Ethernet, radio frequency transmission, satellite, and short haul modems or any other known method to communicate electronic data. At programmed intervals, for example hourly or daily, the host computer employs the communication path to receive the meteorological data measured and stored by the weather station.

In the present application, the host computer may be coupled to the site control devices in a variety of ways. For example, the host and the site control devices at all sites may be coupled by wireless links, such as radio or microwave, or may be hard-wired together, such as by telephone lines. Alternatively, the host may be coupled (either by wireless link or hardwired) to a single site control device. The site control device controls a plurality of irrigation valves and open or close them based on the deficit irrigation data received from the host computer. Each irrigation valve irrigates an irrigation zone which is determined by the user and based on the plants diversity, plants density, etc.

The deficit irrigation may be computed from a variety of data. In one example, the deficit irrigation may be computed from meteorological data and forecasted weather conditions and the stress intensity factor collected by the host computer. The host computer can be configured such that it computes a unique deficit irrigation for each site and irrigation zone within the site. Alternatively the host computer may be configured to use a universal deficit irrigation for irrigation sites located in a geographical area with similar climate conditions and to share the data requirements to determine the deficit irrigation between the host computer and the site control devices. For example, the host computer would utilize meteorological data and evapotranspiration data, and send the computed deficit irrigation to the site control devices. In this way, only one-way communications from the host computer to the site control devices is needed. This method considers all the necessary parameters to calculate deficit irrigation upon predicted meteorological data, evapotranspiration data and stress intensity factor and provides for the adjustment of irrigation schedules to optimize use at a lower cost to savings ratio.

In another example, past or historical meteorological data may be used to make corrective adjustments to the irrigation schedules that have been predicted using meteorological forecasting. That is, as each day becomes past or historical, adjustments to the overall cumulative depletion of water in the soil need to be made. When an irrigation site is to be updated with a new irrigation schedule, actual meteorological data, received from a host, e.g. local weather station, is first used to correct any differences between the previously forecast and actual meteorological data to the current day. After past cumulative depletion has been determined, future predictions of the ET and other meteorological values are incorporated to determine deficit irrigation. Future meteorological data predictions can be updated or modified as new data becomes available, thereby allowing closer matching of predicted ET values with actual ET values. Modifying meteorological data on a daily basis results in predictions that more closely follow actual ET values than updating on a weekly or longer schedule.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A deficit irrigation method comprising:
   receiving, at a controller, a plurality of inputs including a growth stage of a plant, a development stage of the plant, a water level at a reservoir, and a full irrigation data;
   computing, at the controller, a stress intensity factor for irrigation of a plant, wherein:
      the stress intensity factor represents a strength of the plant to a deficit irrigation,
      the stress intensity factor is represented by K having a value between 0 and 1 with a larger value of K reflecting a higher strength to the deficit irrigation and a lower value of K reflecting a lower strength to the deficit irrigation, and
      the stress intensity factor is computed based on the age of the plant, the development stage of the plant and the water level in the reservoir;
   computing, at the controller, a correction factor based on the calculated stress intensity factor;
   computing, at the controller, a deficit irrigation factor based on the correction factor and the full irrigation data; and
   controlling an irrigation valve in a wired or a wireless communication with the controller to enable a deficit irrigation of the plant in accordance with the deficit irrigation factor, wherein the deficit irrigation factor controls when and how much to irrigate via the irrigation valve.

2. The method of claim 1, wherein the growth stage of the plant and the development stage of the plant are received from a user.

3. The method of claim 1, wherein the development stage of the plant includes a germination phase, a vegetative phase, a reproductive phase or a ripening phase of the plant.

4. The method of claim 1, wherein the growth stage of the plant is calculated based on an age of the plant.

5. The method of claim 1, further comprising:
sending a request, from the controller, to a water level sensor located in a water reservoir, for water level data; and
responsive to the request, receiving, at the controller and from the water level sensor, the water level data.

6. The method of claim 1, wherein the water level indicates a volume of the available water for irrigation in the water reservoir.

7. The method of claim 1, wherein the full water irrigation is the water needed by the plant to maximize the harvest.

8. The method of claim 1, wherein the stress intensity factor, K, is computed based on fuzzy theory.

9. The method of claim 1, wherein the correction factor is computed based on subtracting the stress intensity factor from one.

10. The method of claim 1, wherein the deficit irrigation factor is computed by multiplying the correction factor by the full irrigation.

11. The method of claim 1, further comprising receiving at the controller and from a valve sensor the deficit irrigation data in accordance with the deficit irrigation factor.

12. The method of claim 1, wherein controlling the irrigation valve includes sending over a wired communication network and from the controller a control signal to the irrigation valve to control the irrigation valve in accordance with the deficit water irrigation factor.

13. The method of claim 1, further comprising;
sending a request from the controller to a server for evapotranspiration data;
receiving at the controller from the server the evapotranspiration data; and
calculating the full water irrigation data based on the evapotranspiration data.

14. A deficit irrigation system comprising:
a water storage unit configured to store water for watering a plant;
a pump in communication with the water storage unit;
a plurality of irrigation valves in communication with the pump;
a controller in communication with the water storage unit, pump and the irrigation valves, wherein the controller is configured to:
receive a plurality of inputs including a growth stage of a plant, a development stage of the plant, a water level at the water storage, and a full irrigation data;
compute a stress intensity factor for irrigation of a plant, wherein:
the stress intensity factor represents a strength of the plant to a deficit irrigation,
the stress intensity factor is represented by K having a value between 0 and 1 with a larger value of K reflecting a higher strength to the deficit irrigation and a lower value of K reflecting a lower strength to the deficient irrigation, and
the stress intensity factor is computed based on the growth stage of the plant, the development stage of the plant and the water level in the reservoir;
compute a correction factor based on the calculated stress intensity factor;
compute a deficit water irrigation factor based on the correction factor and the full irrigation data; and
control the irrigation valves in a wired or a wireless communication with the controller to enable a deficit irrigation of the plant in accordance with the deficit irrigation factor, wherein the deficit irrigation factor controls when and how much to irrigate via the irrigation valve.

15. The system of claim 14, further comprising a relaying device configured to receive the deficit irrigation data from the controller and transmit the deficit irrigation data to the irrigation valves.

16. The system of claim 14, wherein the controller is configured to send the deficit irrigation data to the irrigation valves via a wireless connection.

17. The system of claim 14 wherein the controller is configured to send the deficit irrigation data to the irrigation valves via a wired connection.

18. The system of claim 14, wherein the controller is further configured to:
send a request to a server for meteorological data and evapotranspiration data, and
receive from the server the meteorological data and evapotranspiration.

19. The system of claim 18, wherein the server is a weather station.

20. The system of claim 18, wherein the server is an online weather forecasting website.

* * * * *